Patented July 8, 1941

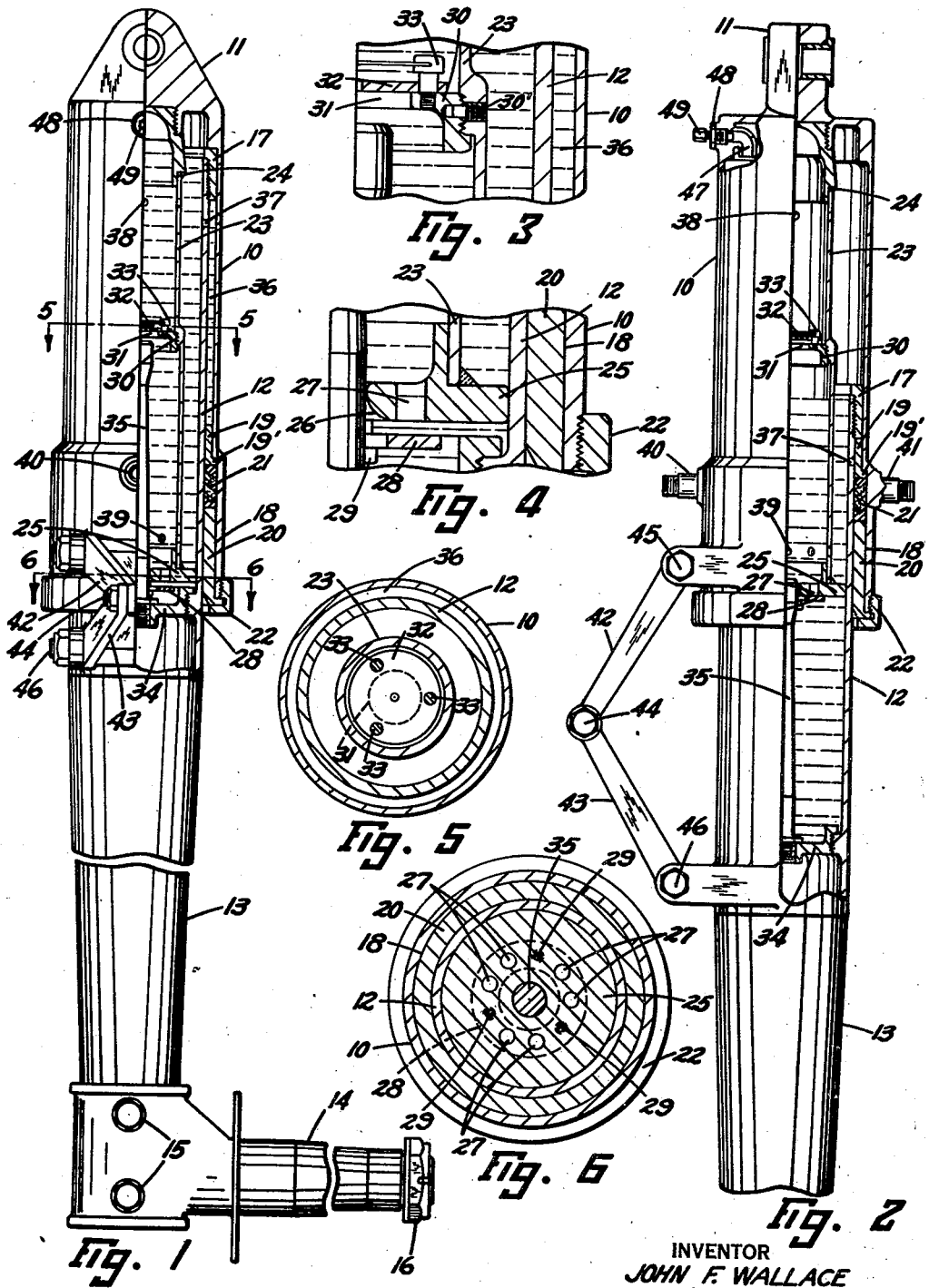

2,248,836

UNITED STATES PATENT OFFICE 2,248,836

SHOCK ABSORBING STRUT

John F. Wallace, Shaker Heights, Ohio, assignor to The Cleveland Pneumatic Tool Company, Cleveland, Ohio, a corporation of Ohio Application May 5, 1939, Serial No. 271,926

7 Claims. (Cl. 267—64)

This invention relates broadly to shock absorbers, but more particularly to shock absorbing struts of the hydropneumatic type.

One object of this invention is to produce a shock absorbing strut of the hydropneumatic type forming a simple and compact assembly which is strong, durable and efficient.

Another object of this invention is the provision in a shock absorber of improved valve supporting means affording a strong and relatively light construction.

Still another object of this invention is to produce a shock absorbing strut constructed and arranged in a manner enabling retraction of the landing gear associated therewith without danger of affecting the efficiency of the strut immediately after being lowered into landing position.

Other objects and advantages more or less ancillary to the foregoing reside in the specific construction and aggroupment of the elements peculiar to this structure, as will become apparent from a more complete examination of this specification.

In the drawing:

Fig. 1 is a side elevational view, partly in section, of a shock absorbing strut embodying the invention, the strut being shown in fully compressed condition.

Fig. 2 is a view similar to Fig. 1 showing the strut in fully extended condition.

Fig. 3 is an enlarged view of the sectional portion of the strut shown in the vicinity of line 5—5 in Fig. 1.

Fig. 4 is an enlarged view of the sectional portion of the strut shown in the vicinity of line 6—6 in Fig. 1.

Fig. 5 is an enlarged cross sectional view taken in a plane indicated by line 5—5 in Fig. 1.

Fig. 6 is an enlarged cross sectional view taken in a plane indicated by line 6—6 in Fig. 1.

Referring to the drawing: 10 represents an upper cylinder or casing closed at its upper end by a clevis housing 11 through which the shock absorber may be pivotally attached to the fuselage of the craft. Slidable within the cylinder 10, there is an inner cylinder 12 including an extension 13 carrying a wheel axle 14 rigidly secured thereon by any suitable means such as cross bolts 15. On the axle 14, which extends laterally from the cylinder 12, may be mounted a landing wheel (not shown) held in operative position by a nut 16.

The upper end of the cylinder 12 is threaded to receive a head 17 slidably engaging the cylinder 10, while the cylinder 10 has its lower or inner end portion enlarged or counterbored as at 18 to accommodate two bearings 19 and 20 having mounted between them packing rings 21 affording a fluid tight joint between the two cylinders. Endwise movement in one direction of the bearings 19 and 20 is prevented by a ring 22 screwed on the extreme lower end of the cylinder 10, and in the other direction by an annular flange 19' formed on the bearing 19 and resting against the bottom of the counterbore 18.

Disposed concentrically within the upper cylinder 10, there is an inner tube 23 having its upper end affixed to the closed end 11 by any suitable means such as a weld 24. On the lower end of the tube 23, there is affixed a piston 25 slidably engaging the inner wall of the cylinder 12, and having an orifice 26 and a port or by-pass 27 extending therethrough, the former disposed in coaxial alignment with the center axis of the tube, while the port 27 is controlled by a flap valve 28 operatively mounted on the piston 25 by one or more cap screws 29, and capable of engagement with the lower surface of the piston as clearly shown in Fig. 4.

Within the tube 23, there is provided a partition 30 rigidly secured to the tube by any suitable means such as set screws 30', and formed with a central port 31, which port is controlled by a flap valve 32 engageable with the upper surface of the partition 30 and operatively mounted thereon by cap screws 33.

Intermediate its ends, the cylinder 12 is provided with a cross wall 34 carrying a tapered metering pin 35 extending upwardly therefrom into the inner tube 23 centrally through the orifice 26 for gradually varying the liquid conveying capacity of the orifice. The pin 35 is calculated to fall short of the partition 30 when the cylinders are fully compressed as shown in Fig. 1, and to have its upper end portion remaining within the orifice 26 when the cylinders are fully extended as shown in Fig. 2.

Between the cylinders 10 and 12, there is an annular chamber 36 closed at its upper end by the head 17 and at its lower end by the bushing 19. This annular chamber is capable of communication with the interior of the cylinder 12 via one or more ports 37 provided through the wall of the cylinder 12 near the upper end thereof, while the interior of the inner tube 23 is in communication with the interior of the cylinder 12 through one or more ports 38 extending through the wall of the tube 23 within the portion thereof located above the partition 30, and via one or more fixed leak orifices 39 provided through the wall of the tube 23 near the piston 25.

Adjacent its lower end, the cylinder 10 is provided with two diametrically opposed trunnions 40 and 41 preferably formed integrally with the cylinder and adapted to pivotally receive the mechanism for retraction of the strut.

In order to prevent relative rotation of the two cylinders 10 and 12, there are provided upper and lower torque legs 42 and 43 pivotally interconnected at one end by a cross shaft 44, while the other ends of the torque legs are pivotally connected to the two cylinders respectively by cross shafts 45 and 46.

Within the upper end of the cylinder 10, there is provided a filler tube 47 normally closed by a filler plug 48 and an air valve 49.

In operation, the shock absorbing strut is pivotally connected to the craft by any suitable means such as a shaft extending through the clevis 11, and is maintained in operative position by any suitable retracting mechanism operatively associated with the trunnions 40 and 41. After the strut is thus mounted on the craft, noncompressible fluid such as oil is poured into the cylinders until it reaches the level of the filler tube 47 when the strut is fully compressed, and subsequently compressed air is also introduced into the cylinder through the air valve 49 until the oil within the strut is subjected to a predetermined pressure causing partial extension of the strut. After taking off, the weight of the lower cylinder 12 together with the action of the compressed air within the strut, will cause complete extension of the strut, which extension is limited by the engagement of the head 17 with the bushing 19. Subsequently, the strut, while in fully extended condition, may be retracted into substantially horizontal position by the retracting mechanism active on the trunnions 40 and 41. As the strut is retracted from a substantially vertical into a horizontal position, the liquid within the cylinder 12 below the piston 25 will flow through the orifice 26 into the tube 23. Subsequently when lowering the strut into vertical position preparatory to the landing of the craft, it is important to enable a free flow of the liquid from above to below the piston 25 in order to put the strut in operative condition. In the present construction, as the landing gear is being lowered, the liquid from above the piston 25 will flow freely below the piston through the ports 27 now opened by the flap valve 28, thereby enabling the strut to be in operative condition as soon as the landing gear is lowered into landing position.

When landing, the load of the craft relative to the landing wheel will effect the compression stroke of the strut, which stroke is checked by the compressed air within the upper end of the cylinder 10 and by the upward flow of the liquid through the orifice 26. In this instance, this upward flow of the liquid will cause the valve 28 to move and remain in closed position relative to the ports 27, thereby causing the upward displacement of the liquid to take place only through the orifice 26 metered by the tapered pin 35. During this compression stroke of the strut, the upward flow of the liquid will also shift and maintain the valve 32 in open position relative to the port 31 of the partition 30, enabling free flow of the liquid into the upper portion of the tube 23 and therefrom into the cylinder 12 and the chamber 36 via the ports 38 and 37 respectively.

After compression, the recoil movement of the craft relative to the landing wheel resulting in the extension stroke of the strut, will cause the liquid to flow from above to below the piston 25. In this instance, the downward flow of the liquid will move and maintain the flap valve 32 in closed position relative to the port 31, causing the liquid to flow from the portion of the cylinder 12 above piston 25 into the lower end portion of the tube 23 via the ports 39, and therefrom into the cylinder 12 below the piston 25 via the piston orifice 26 and the ports 27, which ports are now opened by the flap valve 28 due to the action of the downward flow of the liquid thereon. Simultaneously the liquid will also escape from the chamber 36 into the cylinder 12 via the port 37. The ports 37 and 39 being relatively small will prevent a free downward flow of the liquid, thereby checking the recoil movements of the craft.

From the foregoing description, it will be understood that while the ports 27 through the piston 25 enable a free flow of the liquid from above to below the piston, these ports are rendered inoperative by the flap valve 28 during the compression stroke of the strut, which stroke is checked by the displacement of the liquid through the orifice 26 metered by the pin 35.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A shock absorbing strut comprising upper and lower telescoping cylinders having fluid stored therein, an inner tube supported and fixed concentrically within the upper cylinder, a piston on the lower end of said tube having an orifice and a by-pass opening into said tube, a metering pin within the lower cylinder slidable through said orifice, a flap valve on said piston permitting flow of fluid only downwardly through said by-pass, a valve seat supported by and fixed within said tube at a place intermediate the ends thereof having a port therethrough, and a flap valve carried by said seat movable into open or closed position relative to said port.

2. A shock absorbing strut comprising a pair of telescoping cylinders having fluid stored therein, an inner tube concentrically within one of said cylinders having one end fixed thereto, an apertured piston on the other end of said tube, a flap valve on said piston permitting flow of fluid downwardly therethrough, an apertured valve seat supported by and fixed within said tube, and a flap valve on said seat permitting flow of fluid upwardly therethrough.

3. A shock absorbing strut comprising a pair of telescoping cylinders, a cylindrical chamber between the outer ends of said cylinders, an inner tube concentrically within said chamber, an apertured piston carried by said tube, a flap valve on said piston enabling flow of fluid downwardly therethrough, an apertured valve seat fixed within said tube, and a flap valve on said seat enabling flow of fluid upwardly therethrough.

4. A shock absorbing strut comprising a pair of telescoping cylinders having liquid stored therein, an inner tube concentrically within one of said cylinders having one end fixed thereto, a piston on the other end of said tube, an orifice and a by-pass through said piston, metering means for said orifice and a flap valve controlling said by-pass, an apertured valve seat supported by and fixed within said tube at a place intermediate the ends thereof, and a flap valve on said seat permitting flow of fluid upwardly therethrough.

5. A shock absorber comprising a pair of telescoping cylinders, a head on the inner end of the inner cylinder slidably contacting the outer cylinder, an annular chamber between said cylinders, a tube depending from the outer cylinder concentrically into the inner cylinder, an orificed plate partly closing the inner end of said tube, a metering pin carried by the inner cylinder slidable through the orifice of said plate, a valve controlled by-pass through said plate, a valve controlled apertured partition intermediate the ends of said tube, and ports through the side walls of said inner cylinder and tube affording communication between said annular chamber and the interior of said tube.

6. A shock absorbing strut comprising a pair of telescoping cylinders having fluid stored therein, an inner tube supported and fixed concentrically within the upper cylinder, a piston on the lower end of said tube having an orifice and a by-pass opening into said tube, a metering pin carried by the lower cylinder cooperating with said orifice, a flap valve on said piston permitting flow of fluid only downwardly through said by-pass, an apertured partition supported by and fixed within said tube, a flap valve on said partition permitting flow of fluid only upwardly therethrough, and ports through the side wall of said tube one below and the other one above said partition.

7. A shock absorbing strut comprising a pair of telescoping cylinders, an inner tube within one of said cylinders, a pair of longitudinally spaced apertured partitions within said tube, and a flap valve on each partition enabling flow of fluid downwardly through one partition and upwardly through the other.

JOHN F. WALLACE.